(12) United States Patent
Svrcek et al.

(10) Patent No.: US 9,789,806 B2
(45) Date of Patent: Oct. 17, 2017

(54) APPARATUS OF A PROGRESSIVE INDICATOR, ESPECIALLY FOR A CAR HEADLIGHT OR LAMP

(71) Applicant: Varroc Lighting Systems, s.r.o., Senov u Noveho Jicina (CZ)

(72) Inventors: Martin Svrcek, Dobra (CZ); Tomas Teska, Hlucin (CZ)

(73) Assignee: Varroc Lighting Systems, s.r.o. (CZ)

( * ) Notice: Subject to any disclaimer, the term of this patent is extended or adjusted under 35 U.S.C. 154(b) by 0 days.

(21) Appl. No.: 15/445,192

(22) Filed: Feb. 28, 2017

(65) Prior Publication Data
US 2017/0253171 A1     Sep. 7, 2017

(30) Foreign Application Priority Data

Mar. 1, 2016 (CZ) .................................... 2016-121

(51) Int. Cl.
| | |
|---|---|
| B60Q 1/02 | (2006.01) |
| B60Q 1/00 | (2006.01) |
| B60Q 1/26 | (2006.01) |
| B60Q 1/38 | (2006.01) |
| B60Q 1/04 | (2006.01) |
| H05B 33/08 | (2006.01) |

(52) U.S. Cl.
CPC ......... B60Q 1/0076 (2013.01); B60Q 1/0088 (2013.01); B60Q 1/04 (2013.01); B60Q 1/2607 (2013.01); B60Q 1/38 (2013.01); H05B 33/0842 (2013.01); H05B 33/0884 (2013.01)

(58) Field of Classification Search
None
See application file for complete search history.

(56) References Cited

U.S. PATENT DOCUMENTS 7,439,944 B2 * 10/2008 Huynh ............... H05B 33/0818
                                                        315/185 S
8,008,864 B2 *  8/2011 Nguyen ............. H05B 33/0815
                                                        315/121
(Continued)

FOREIGN PATENT DOCUMENTS

JP       2006147933 A      6/2006

OTHER PUBLICATIONS

Search Report from Corresponding Czech Application No. PV-2016-121, dated Nov. 10, 2016 (3 pages).

*Primary Examiner* — Anh Tran
(74) *Attorney, Agent, or Firm* — Hovey Williams LLP

(57) ABSTRACT

The apparatus of a progressive direction indicator, especially for a car headlight or lamp, comprises the main connector (1) as the input electric interface, an LDM power supply module (2) for the power supply of the LED light sources (7), an LED board (4) where the LED light sources are mounted, and an interface (3) interconnecting the LDM power supply module with the LED board. The apparatus further comprises a current controller (9) for setting the current of the LED light sources, with the LDM power supply module comprising a DC/DC converter (5) generating the output voltage V out, which is the voltage source for the LED board. The LED board comprises discrete switching elements (8) for switching of individual LED light sources depending on the input voltage, so that the LED light sources are sequentially switched depending on the output voltage V out.

6 Claims, 3 Drawing Sheets

(56) References Cited

U.S. PATENT DOCUMENTS

Figure 1:
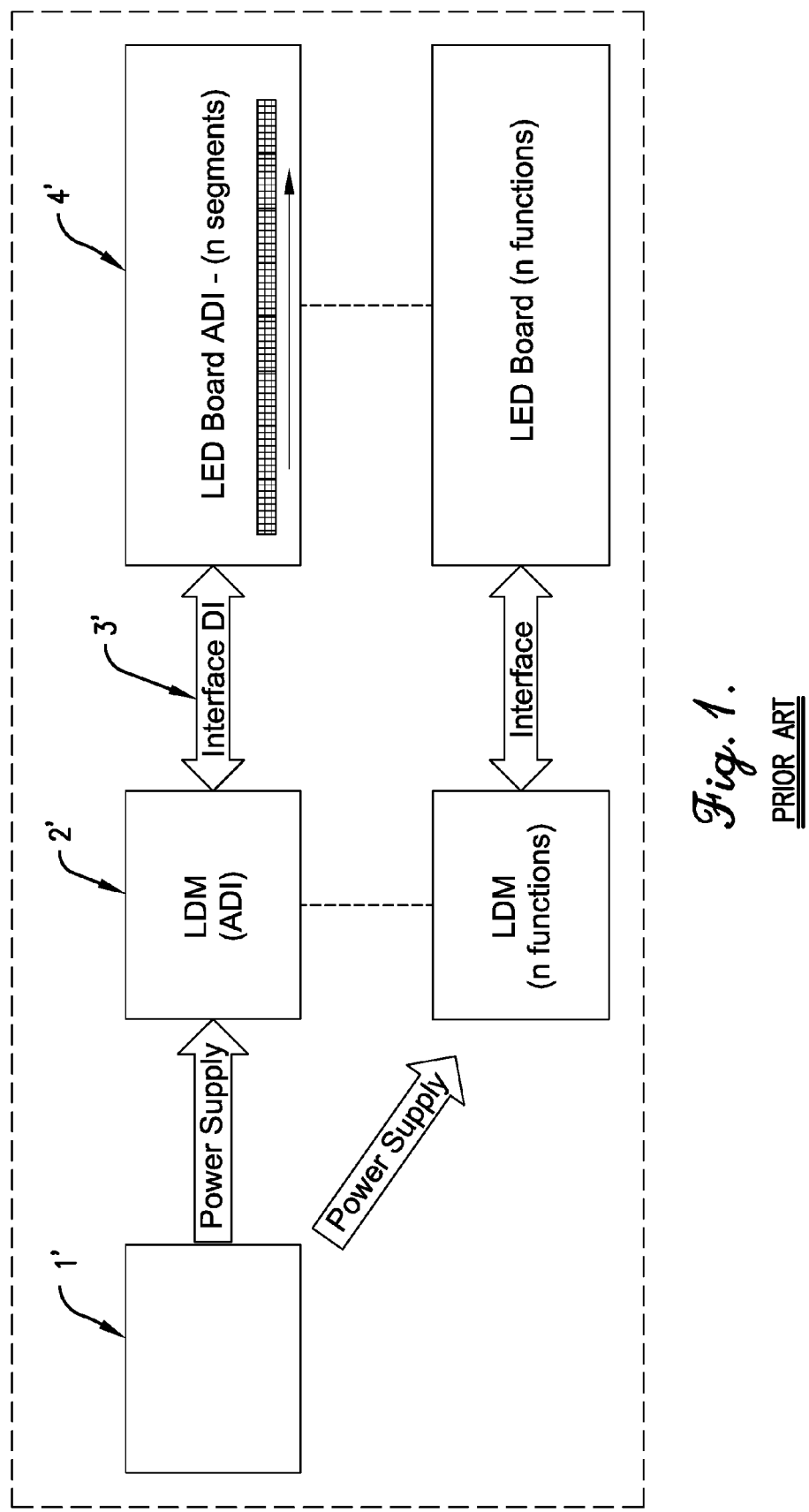

| | | | |
|---|---|---|---|
| 8,981,649 B2* | 3/2015 | Lee | H05B 33/083 |
| | | | 315/122 |
| 2005/0243022 A1* | 11/2005 | Negru | H05B 33/0857 |
| | | | 345/46 |
| 2011/0084619 A1 | 4/2011 | Gray | |
| 2011/0199003 A1 | 8/2011 | Muguruma et al. | |
| 2011/0227489 A1 | 9/2011 | Huynh | |
| 2013/0169160 A1 | 7/2013 | Kim et al. | |
| 2013/0200802 A1* | 8/2013 | Sakuragi | H05B 33/083 |
| | | | 315/122 |

* cited by examiner

APPARATUS OF A PROGRESSIVE INDICATOR, ESPECIALLY FOR A CAR HEADLIGHT OR LAMP

FIELD OF THE INVENTION

The present invention relates to the apparatus of a progressive direction indicator, especially for a car headlight or lamp, that comprises LED light sources and uses sequential switching on/off of individual light elements. The apparatus makes it possible to implement animated or sequential or progressive direction indications.

BACKGROUND INFORMATION

Modern light sources of cars focus on the light performance, style and appearance, as well as on modern technologies such as LED sources, etc. Due to this fact, the design of these elements is gradually becoming more complex and complicated.

The power supply, or control of LEDs (Light Emitting Diodes), is one of the main tasks of the development of electronic systems. For the power supply of individual LEDs or LED chains or LED arrays, current power supply units are generally used. Some functions use a sophisticated system of switching of individual elements in the lamp to ensure a more attractive appearance, and better functionality. One of these functions is progressive switching of LEDs to provide an animated direction indicator.

For the control of progressive switching, several system concepts and architectures are commonly used, which are described below.

Switching of individual LEDs by means of special circuits is one of the most frequently used solutions. A DC/DC converter (direct current converter) implemented as a current power supply unit is used, the LED board containing a dedicated circuit that is able to switch on or off individual LEDs at given intervals based on a command. These circuits can ensure control of all functions—detection, timing, and switching, or can control just a partial function, e.g. switching, with the other functions being controlled by an LDM (LED drive module). A disadvantage of such a solution is the necessity to provide a complicated interface between the LED board and the LDM, and typically includes a high cost, with an advantage being its relatively easy use and implementation.

Another known solution consists in switching and control of LEDs by means of a u-controller controlling (switching) each LED individually. In this case, a DC/DC converter is also implemented as a current power supply unit. A disadvantage of such a solution is a complicated interface between the LED board and the LDM, and the necessity to use a u-controller with a sufficient number of outputs.

Another known variant is implementation of the progressive function by means of discrete components without using a u-controller. For the power supply, a DC/DC converter is also used, and LEDs are switched individually by means of transistors. For the generation of time constants, RC circuits are used (e.g., circuits of resistors and capacitors). Disadvantages include its complexity, not quite sufficient wiring reliability, and inaccurate timing, while an advantage may be a lower price.

The attached FIG. 1 shows an example of a known design of the light function in a car lighting application, such as a headlamp or a rear lamp. The apparatus consists of the main connector 1', an LDM power supply unit 2', a connecting interface 3' and a LED board 4' containing light emitting diodes and switching electronic components. The main connector 1' represents the input electronic interface of the lamp. The light control unit (BCM) provides the respective light functions via the car cabling and the main connector of the lamp. The LED board 4' contains components for the control of switching and generation of light, with the LED board controlling functions including headlights, meeting lights, daylights, etc. LDM 2' is an electronic part responsible for the power supply of the LED light sources. The interface 3' provides interconnection between LDM 2' and the LEDs 4'.

PRINCIPLE OF THE INVENTION

The above mentioned disadvantages of the prior art are resolved and the objectives of the invention are fulfilled by the apparatus of a progressive direction indicator of the present inventions, especially for a car headlight or lamp. This apparatus comprises the main connector as the input electric interface, an LDM power supply module for the power supply of the LED light sources, an LED board where the LED light sources are mounted, and an interface interconnecting the LDM power supply module with the LED board. The LED board further comprises a current controller for setting the current of the LED light sources. The LDM power supply module comprises a DC/DC inverter generating the output voltage V out, which is the voltage source for the LED board. The LED board comprises discrete switching elements for switching of individual LED light sources depending on the input voltage, so that the LED light sources are sequentially switched on/off depending on the output voltage V out.

In one of the embodiments of the present invention, the switching elements are transistors.

In one of the embodiments of the present invention, the LDM power supply module further contains a u-controller to control the amount of the output voltage V out generated by the DC/DC converter.

The current controller in one of the embodiments of the present invention is preferably mounted on the LED board.

In another embodiment of the present invention, the current controller may be part of the LDM power supply module.

In one of the embodiments of the present invention, the u-controller is also configured to control the switching frequency of the LED light sources and/or to detect damage of the LED light sources with the use of A/D inputs from the current controller.

OVERVIEW OF FIGURES IN THE DRAWINGS

Figure 2:
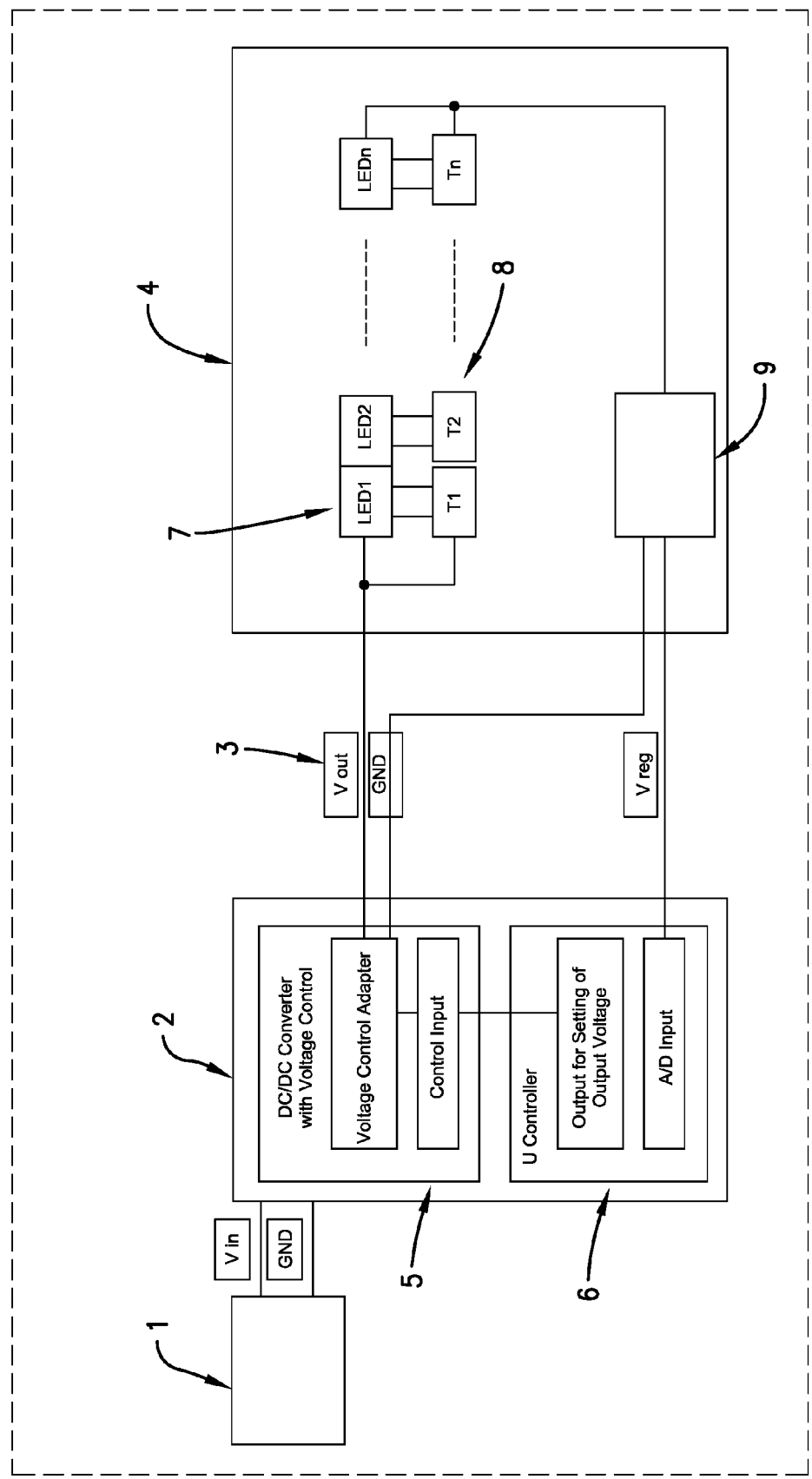
Figure 3:
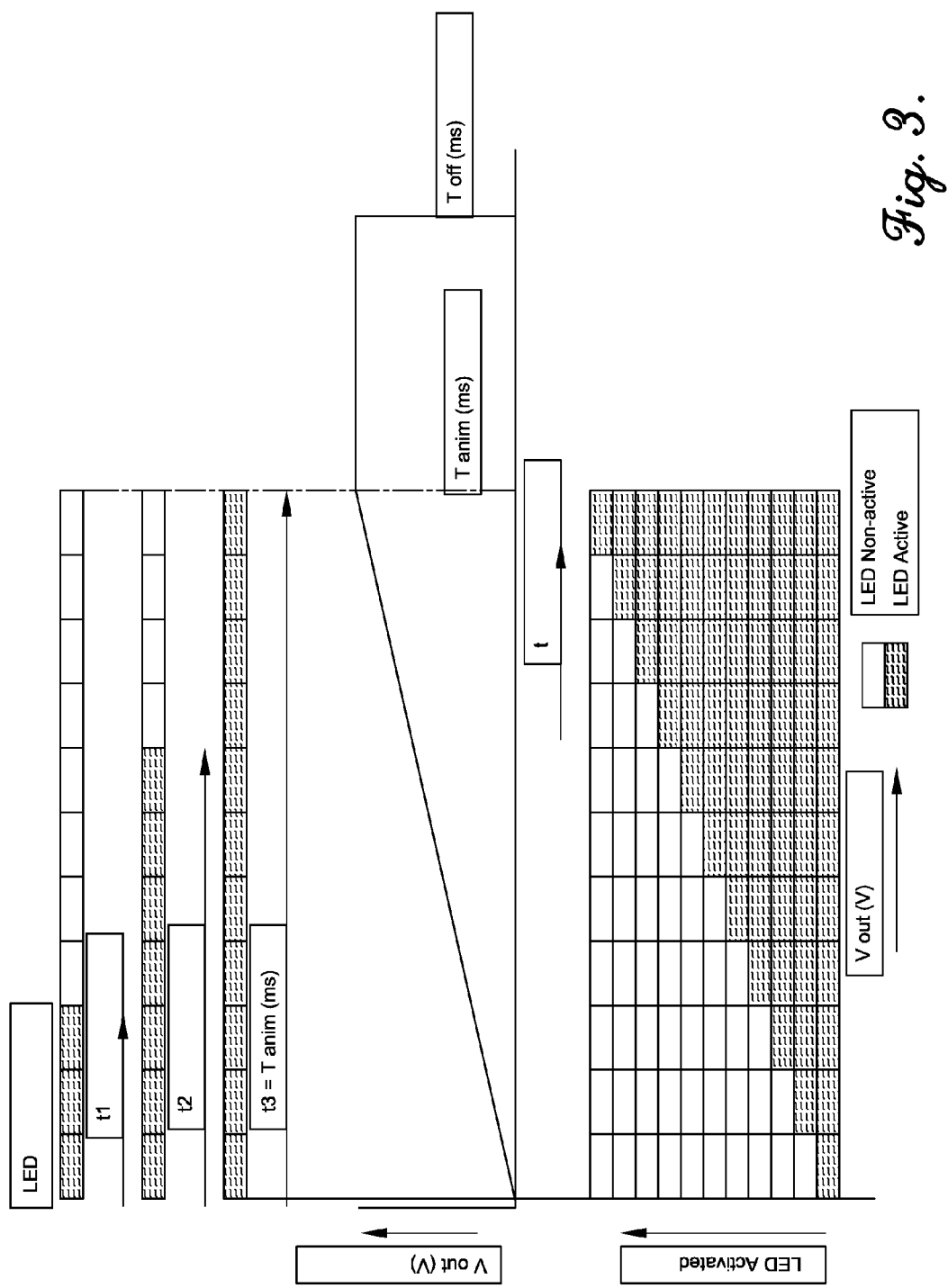

The present invention will be further clarified in more detail with the use of embodiment examples referring to the enclosed drawings where:

FIG. 1 shows an example of an implementation of the wiring of the light function known from the prior art, FIG. 2 shows a block diagram of the wiring architecture of the progressively controlled function in accordance with the present invention, and FIG. 3 is a graphic representation of switching of individual LEDs in the course of time (top part of the figure), time course of voltage generated by LDM (central part) and the number of switched LEDs depending on the output voltage of LDM V out (bottom part), all on accordance with the present invention.

EXAMPLE OF EMBODIMENTS

An embodiment example of the invention will now be described with reference to the attached FIG. 2. FIG. 2 shows a block diagram of the proposed wiring architecture of the progressively controlled function used, for example, with a headlamp or rear lamp. The block diagram consists of the following elements: Input connector 1, which supplies the input voltage to the lamp, DC/DC converter 5, which generates at its output the output voltage—V out, which corresponds to the required number of switched on LED light sources 7. The amount of this voltage and the timing of its changes are controlled by a u-controller 6, e.g. a microcontroller or a single-chip processor, which, through sensing of the voltage V reg at the A/D input, also provides detection and synchronization of individual LED light sources 7 as well as compensation for various forward voltage bins. The LED board 4 contains individual LED light sources 7, and the respective discrete switching elements 8, which are preferably transistors, and the current controller 9. The switching elements 8 are suitably interconnected in such a way as to ensure sequential switching of individual LED light sources 7, depending on the supply voltage V out. The current controller 9 is then responsible for the setting and stabilization of current flowing through individual LED light sources 7. The interconnecting interface 3 ensures interconnection of the power supply LDM module 2 and the LED board 4, and comprises the V out, V reg and GND signals.

The present invention proposes a new system architecture comprising a DC/DC converter 5 working as a voltage power supply, the time sequence of switching of individual LED light sources 7 being based on the output voltage of the LDM supply module 2 through suitable wiring of the switching elements 8 and sufficient current control. The detection and control of the switching is carried out by a simple controller 6. Advantages of the architecture of the present invention are a relatively low price, and a simple interface.

The proposed design of the architecture for implementation of the animated direction indicator ensures gradual switching on and off of individual segments of the particular function. The DC/DC converter 5, which is part of the LDM power supply module 2, is responsible for the required time-variable voltage output based on the u-controller 6 settings within the proposed architecture. Depending on the input voltage of the LED board 4, individual switching elements 8 are switched on/off to control activation/deactivation of the respective LED light sources 7. The current controller 9 then ensures proper setting of the working current of the LED light sources 7. The advantageous function of the u-controller 6 is proper setting of the time profile of the switching by means of the voltage control output into the DC/DC converter 5 on the one hand, and control of the switching sequence and detection of individual LED light sources 7 through the input from the current controller 9 on the other hand.

FIG. 3 shows a graphic representation of sequential switching of individual LED light sources 7 in the course of time in its top part. The central part of FIG. 3 then shows the time course of the output voltage V out generated by the LDM power supply module 2. The bottom part of FIG. 3 shows the number of switched on LED light sources 7 depending on the output voltage V out provided by the LDM power supply module 2.

The above described concept of a voltage controlled direction indicator is an innovative concept of control and power supply of an animated direction indicator (ADI) in automotive applications. This concept is implemented by means of the LDM power supply module 2 and the control circuits of the LED board 4, ensuring the required functionality.

The following electric components participate in the light generation process: the main connector 1, which represents the input electric interface of the lamp, and the LDM power supply module 2, ensuring power supply and control of individual LED light sources 7 mounted together with the other electronic components on the LED board 4 and interconnected with the respective interface 3.

In the described design, the architecture of the LDM power supply module 2, LED board 4 and their interface 3 is based on the technology that uses sequential switching of individual LED light sources 7 depending on the voltage generated by the DC/DC converter 5 by means of transistors, switching individual LED light sources 7 depending on the input voltage, and achieving gradual activation of the LED light sources 7 based on the output voltage V out. The rate of switching on/off of individual LED light sources 7, or animated sequence, is controlled by the u-controller 6 setting a suitable output of the DC/DC converter 5. The u-controller 6 can also control the switching sequence and detect damage of the LED light sources 7 by means of A/D inputs. The current of the LED light sources 7 is set by the current controller 9.

LIST OF REFERENCE MARKS

1'—main connector—prior art
2'—LDM power supply module—prior art
3'—interface—prior art
4'—LED board—prior art
1—main connector
2—LDM power supply module
3—interface
4—LED board
5—DC/DC converter
6—u-controller
7—LED light source
8—switching elements
9—current controller

What is claimed as the invention is:

1. An apparatus of a progressive direction indicator, especially for a car headlight or lamp, comprising a main connector (1) as an input electric interface, an LDM power supply module (2) for power supply of LED light sources (7), an LED board (4) where the LED light sources (7) are mounted, and an interface (3) interconnecting the LDM power supply module (2) with the LED board (4), wherein the apparatus further comprises a current controller (9) for setting the current of the LED light sources (7), wherein the LDM power supply module (2) comprises a DC/DC converter (5) generating output voltage V out, which is the voltage source for the LED board (4), and wherein the LED board (4) comprises discrete switching elements (8) for switching of individual LED light sources (7) depending on the input voltage, so that the LED light sources (7) are adapted to be sequentially switched depending on the output voltage V out.

2. The progressive direction indicator apparatus in accordance with claim 1, wherein the switching elements (8) are transistors.

3. The progressive direction indicator apparatus in accordance with claim 1, wherein the LDM power supply module (2) further comprises a u-controller (6) to control the amount of the output voltage generated by the DC/DC converter (5).

4. The progressive direction indicator apparatus in accordance with claim 1, wherein the current controller (9) is mounted on the LED board (4).

5. The progressive direction indicator apparatus in accordance with claim 1, wherein the current controller (9) is part of the LDM power supply module (2).

6. The progressive direction indicator apparatus in accordance with claim 1, wherein the u-controller (6) is also configured with the use of A/D inputs from the current controller (9) to control a switching sequence of the LED light sources (7) and/or to detect damage of the LED light sources (7).

\* \* \* \* \*